United States Patent
Kiefer et al.

(10) Patent No.: US 7,210,628 B2
(45) Date of Patent: May 1, 2007

(54) DYNAMIC SOLID STATE DIFFRACTIVE OPTICS APPLIED FOR READING A DIFFRACTIVE OPTICS MEMORY

(75) Inventors: Renaud Kiefer, Hoenheim (FR); Idriss El Hafidi, Strasbourg (FR); Romualda Grzymala, Strasbourg (FR); Patrick Meyrueis, Strasbourg (FR)

(73) Assignee: Research Investment Network, Inc., Long Beach, CA (US)

( * ) Notice: Subject to any disclaimer, the term of this patent is extended or adjusted under 35 U.S.C. 154(b) by 429 days.

(21) Appl. No.: 10/497,841

(22) PCT Filed: Dec. 7, 2001

(86) PCT No.: PCT/EP01/15420

§ 371 (c)(1),
(2), (4) Date: Jun. 7, 2004

(87) PCT Pub. No.: WO03/049091

PCT Pub. Date: Jun. 12, 2003

(65) Prior Publication Data

US 2005/0141389 A1    Jun. 30, 2005

(51) Int. Cl.
  *G06K 7/10* (2006.01)
(52) U.S. Cl. .................. 235/454; 235/462.01
(58) Field of Classification Search ..............
  235/462.01–462.47, 454, 455, 494, 472.01,
  235/472.02, 472.03; 345/48, 84; 369/109.01,
  369/103; 349/39, 201
See application file for complete search history.

(56) References Cited

U.S. PATENT DOCUMENTS

| 5,436,867 | A  |   | 7/1995  | Mok |
|-----------|----|---|---------|-----|
| 5,461,239 | A  | * | 10/1995 | Atherton ...................... 250/566 |
| 5,877,876 | A  | * | 3/1999  | Birdwell ....................... 349/39 |
| 5,946,115 | A  |   | 8/1999  | Noh |
| 6,072,608 | A  |   | 6/2000  | Barbastathis et al. |
| 7,009,581 | B2 | * | 3/2006  | Birdwell ....................... 345/48 |
| 2004/0264358 | A1 | * | 12/2004 | El Hafidi et al. ........ 369/275.3 |
| 2005/0141389 | A1 | * | 6/2005  | Kiefer et al. .......... 369/109.01 |
| 2005/0168856 | A1 | * | 8/2005  | El Hafidi et al. ........... 359/883 |
| 2005/0219670 | A1 | * | 10/2005 | Meyrueis et al. ............. 359/35 |
| 2006/0018182 | A1 | * | 1/2006  | Kieffer et al. .............. 365/232 |

OTHER PUBLICATIONS

Tuantranont A. et al.: "Phase-Only Micromirror Array Fabricated by Standard CMOS Process", Sensors and Actuators, A., Elsevier Sequoia S.A., Lausanne, CH; vol. 89, No. 1-2; Mar. 20, 2001, pp. 124-134, XP004317255—ISSN: 0924-4247.

(Continued)

*Primary Examiner*—Thien M. Le
(74) *Attorney, Agent, or Firm*—Steve A. Wong; Caroline T. Do

(57) ABSTRACT

The apparatus and method of the present invention employ solid state dynamic diffractive optical elements for reading information from a diffractive optics memory. The diffractive optics memory has stored therein information located at a plurality of points of the memory and at a plurality of angles at each one of the points so as to form a plurality of packets of information at each of the points. A matrix of the dynamic diffractive optical elements is configured to shape a laser beam to address the memory at one of the angles of one of the points to reconstruct one of the packets of information.

17 Claims, 8 Drawing Sheets

OTHER PUBLICATIONS

Cowan W. D. et al.: "Surface Micromachined Segmented Mirrors for Adaptive Optics", IEEE Journal of Selected Topics in Quantum Electronic, IEEE Service Center, US, vol. 5, No. 1, Jan. 1999, pp. 90-101, XP000823393—ISSN: 1077-260X.

Rogers, S et al.: "Adaptive Optics Systems Implemented Using Two-Dimensional Phase Retrieval and a Microelectromechanical Deformable Mirror", Optical Engineering, Soc. of Photo-Optical Instrumentation Engineers, Bellingham, US., vol. 39, No. 10, Oct. 2000, pp. 2763-2773, XP000969383—ISSN: 0091-3286.

Lakner H. et al.: "Micromirrors for Direct Writing Systems and Scanners", Proceedings of the SPIE, SPIE, Bellingham, VA, US, No. 3878, Sep. 20, 1999, pp. 217-227, XP008002284.

* cited by examiner

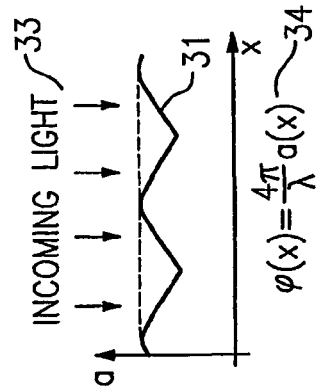
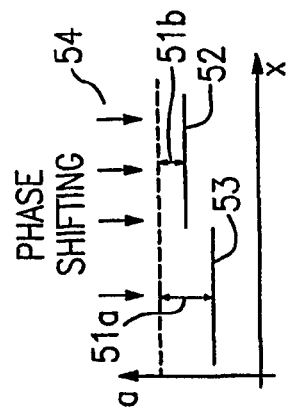
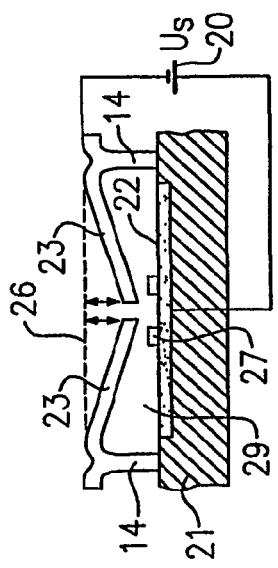
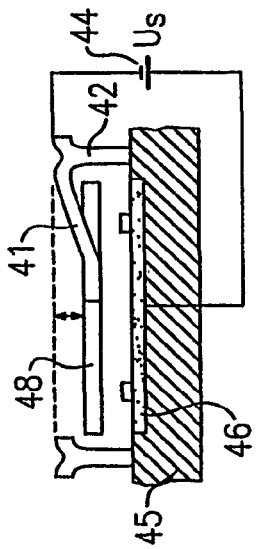
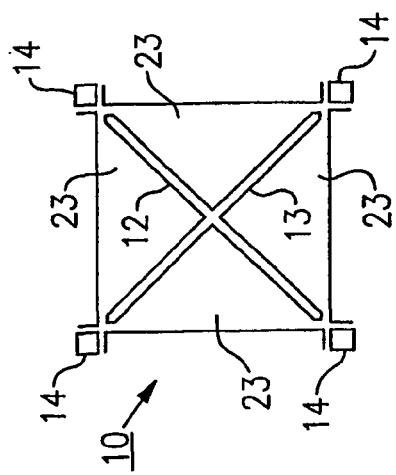
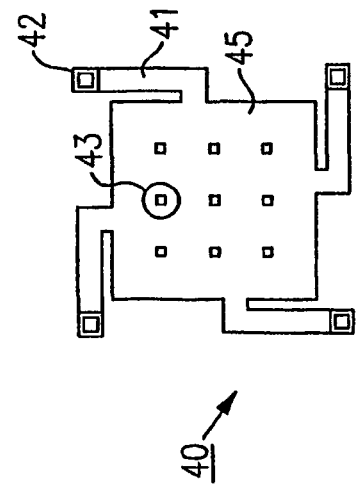

$$\sin(\beta) - \sin(\alpha) = \lambda/a$$

| DDOE NUMBER | Θ (DGREES) | DIFFRACTED BEAM ANGLE (DGREES) | |
|---|---|---|---|
| | | MIN | MAX |
| 1 | 1 | 2 | 7 |
| 2 | 5 | 5 | 10 |
| 3 | 10 | 10 | 16 |
| 4 | 13 | 17 | 22 |
| 5 | 21 | 22 | 27 |
| 6 | 26 | 27 | 32 |
| 7 | 31 | 32 | 38 |
| 8 | 37 | 28 | 44 | ional sizes.
DYNAMIC SOLID STATE DIFFRACTIVE OPTICS APPLIED FOR READING A DIFFRACTIVE OPTICS MEMORY

FIELD OF INVENTION

The present invention generally relates to a diffractive optics memory. In particular, the present invention relates to an apparatus for reading information from the diffractive optics memory using dynamic solid state diffractive optics devices.

BACKGROUND OF THE INVENTION

The large storage capacities and relative low costs of CD-ROMS and DVDs have created an even greater demand for still larger and cheaper optical storage media. Holographic memories have been proposed to supersede the optical disc as a high-capacity digital storage medium. The high density and speed of the holographic memory comes from three-dimensional recording and from the simultaneous readout of an entire packet of data at one time. The principal advantages of holographic memory are a higher information density ($10^{11}$ bits per square centimeter or more), a short random access time (~100 microseconds and less), and a high information transmission rate ($10^9$ bit/sec).

In holographic recording, a light beam from a coherent light source (e.g., a laser) is split into a reference beam and an object beam. The object beam is passed through a spatial light modulator (SLM) and then into a storage medium. The SLM forms a matrix of shutter (in the binary case) or, more generally, a matrix of photocells modulating the light intensity that represents a packet of data. The object beam passes through the SLM which acts to modulate the object beam with the data input to the SLM. The modulated object beam is then processed by an appropriate optical system and then directed to one point on the storage medium by an addressing mechanism where it intersects with the reference beam to create a hologram representing the packet of data.

An optical system consisting of lenses and mirrors is used to precisely direct the optical beam encoded with the packet of data to the particular addressed area of the storage medium. Optimum use of the capacity of a thick storage medium is realized by spatial and angular multiplexing. In spatial multiplexing, a set of packets is stored in the storage medium shaped into a plane as an array of spatially separated and regularly arranged subholograms by varying the beam direction in the x-axis and y-axis of the plane. Each subhologram is formed at a point in the storage medium with the rectangular coordinates representing the respective packet address as recorded in the storage medium. In angular multiplexing, recording is carried out by keeping the x- and y-coordinates the same while changing the irradiation angle of the reference beam in the storage medium. By repeatedly incrementing the irradiation angle, a plurality of packets of information is recorded as a set of subholograms at the same x- and y-spatial location.

Previous holographic devices for recording information in a highly multiplexed volume holographic memory, and for reading the information out, require components and dimensions having a large size which places a limit on the ability to miniaturize these systems. Because previous holographic devices use motors and large-scale components such as mirrors and lenses, the addressing systems of these previous devices are slow. Furthermore, the mechanical components of these previous devices need frequent maintenance to correct errors and dysfunction coming, for instance, from wear and friction (i.e., tribology effect). Furthermore, previous addressing systems are expensive because they use complex systems for control. Thus, their prices cannot be lowered by mass production. Moreover, previous devices are not economical in their energy consumption. Even when previous addressing devices are accurate when new, the wear and friction of the interacting surfaces that are in relative motion lowers their accuracy with time.

In view of the foregoing, it would be desirable to provide one or more techniques which overcomes the above-described inadequacies and shortcomings of the above-described proposed solutions.

Thus, it is an object of the present invention to provide a dynamic diffractive optics reading system made of solid state components.

It is another object of the present invention to provide an apparatus for reading a diffractive optics memory having components that operate faster than systems produced today.

It is a further object of the present invention to provide an apparatus for reading a diffractive optics memory having components that more accurately target movement of the laser beams onto the recorded regions of the diffractive optics memory.

It is yet a further object of the present invention to provide an apparatus for reading a diffractive optics memory having miniature component sizes.

It is still another object of the present invention to provide inexpensive components for a dynamic diffractive optics reading system.

SUMMARY OF THE INVENTION

In order to achieve the above-mentioned objectives, the present invention comprises solid state dynamic diffractive optical elements for reading information from a diffractive optics memory. The diffractive optics memory has stored therein information located at a plurality of points on the memory and at a plurality of angles at each one of the points so as to form a plurality of packets of information at each of the points. The diffractive optics memory is arranged in the form of a matrix, or alternately, may be arranged in other forms, such as a tape and a disk. A matrix of the dynamic diffractive optical elements is configured to shape and angularly direct a wavefront of a coherent light beam to the memory at one of the angles of one of the points to reconstruct one of the packets of information.

In a further aspect of the present invention, a laser generates the coherent light beam, and an acousto-optic device deflects the wavefront of the coherent light beam toward the dynamic diffractive optical elements at a deflection angle with respect to a plane formed by the diffractive optical elements.

In still another aspect of the present invention, the wavefront is shaped by phase shifting of the diffractive optical elements.

In yet another aspect of the present invention, each of the diffractive optical elements comprises a pyramidal element or a piston element.

In still another aspect of the present invention, a computer is configured to program the diffractive optical elements and the acousto-optic device so as to address the memory at one of the points and one of the angles to reconstruct one of the packets.

In a further aspect of the present invention, a detector array is configured comprising a plurality of cells receiving a portion of the wavefront deflected by the diffractive optical elements and deflected by the memory. The detector array may be a CCD detector array.

In another aspect of the present invention, a low powered laser is configured to produce the coherent light beam.

In still another aspect of the present invention, each of the plurality of points stores one or more of the packets of information.

The present invention thus achieves the objectives of fast access time, long life duration, miniaturization, reliability, stability, a limited response to surrounding perturbations, and a lower cost through mass production.

A more thorough disclosure of the present invention is presented in the detailed description which follows and the accompanying drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 5a shows a top view of a pyramidal element.

FIG. 5b shows a side view of a pyramidal element.

FIG. 5c shows the principal of phase modulating by a pyramidal element.

FIG. 6a shows a top view of a piston element.

FIG. 6b shows a side view of a piston element.

FIG. 6c shows the principal of phase shifting by a piston element.

DETAILED DESCRIPTION OF THE INVENTION

Recording Process

Figure 1:
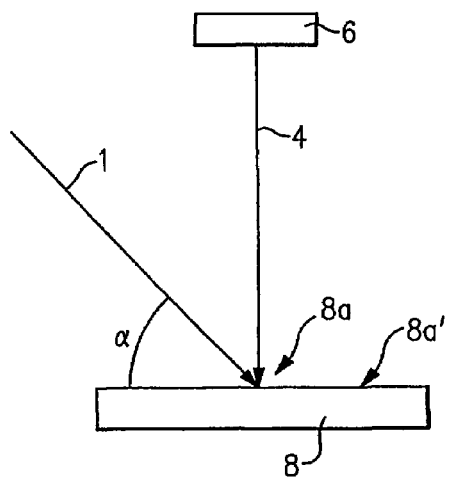
FIG. 1 is a schematic representation of an apparatus for recording an interference pattern according to the present invention.

FIG. 1 shows a schematic of the important signals involved in recording a diffraction pattern, or alternately a hologram, in a storage medium using angular and spatial multiplexing. Various diffractive recording processes have been developed in the art and further details can be found in the book *Holographic Data Storage*, Springer (2000) edited by H. J. Coufal, D. Psaltis, and G. T. Sincerbox. In this specification, the term "diffractive" is used throughout to differentiate prior art holographic technology used for 3-D image generation from diffractive technology necessary for the generation of a storage medium. For example, diffraction efficiency is critical to the viability of any material to be used as a diffractive storage medium. The quality of interference constituting a 3D-hologram is simple to achieve compared to the quality required to realize a storage medium. Moreover, a storage diffractive pattern can also be implemented by using other techniques than the interference of a reference and object beam, such as using an e-beam and a microlithography process to etch materials to generate diffractive structures. For all these reasons, the specification herein introduces the concept of a broader diffractive optics technology.

In forming a diffractive pattern, or alternately a hologram, a reference beam 1 intersects with an object beam 4 to form a diffraction pattern (e.g., a sub-hologram) 8a (referred to alternately as a point) extending through the volume of storage medium 8. There is a separate diffraction pattern at point 8a extending through the volume for each angle and spatial location of the reference beam 1. The object beam 4 is modulated with a packet of information 6. The packet 6 contains information in the form of a plurality of bits or pixels. The source of the information for the packet 6 can be a computer, the Internet, or any other information-producing source. The hologram impinges on the surface 8a of the storage medium 8 and extends through the volume of the storage medium 8. The information for the packet 6 is modulated onto the storage medium 8 by spatial multiplexing and angle multiplexing. Angle multiplexing is achieved by varying the angle α of the reference beam 1 with respect to the surface plane of the storage medium 8. A separate packet 6 of information is recorded in the storage medium 8 as a diffraction pattern (e.g., a sub-hologram) for each chosen angle α and spatial location. Spatial multiplexing is achieved by shifting the reference beam 1 with respect to the surface of the storage medium 8 so that the point 8a shifts to another spatial location, for example point 8a', on the surface of the storage medium 8.

The storage medium 8 is typically a three-dimensional body made up of a material sensitive to a spatial distribution of light energy produced by interference of the object light beam 4 and the reference light beam 1. A diffraction pattern may be recorded in a medium as a variation of absorption or phase or both. The storage material must respond to incident light patterns causing a change in its optical properties. In a volume hologram, a large number of packets of data can be superimposed, so that every packet of data can be reconstructed without distortion. A volume (thick) hologram may be regarded as a superposition of three dimensional gratings recorded in the depth of the emulsion each satisfying the Bragg law (i.e., a volume phase grating). The grating planes in a volume hologram produce change in refraction and/or absorption.

Several materials have been considered as storage material for optical storage systems because of inherent advantages. These advantages include a self-developing capability, dry processing, good stability, thick emulsion, high sensitivity, and nonvolatile storage. Some materials that have been considered for volume holograms are photorefractive crystals, photopolymer materials, and polypeptide material.

Figure 2:
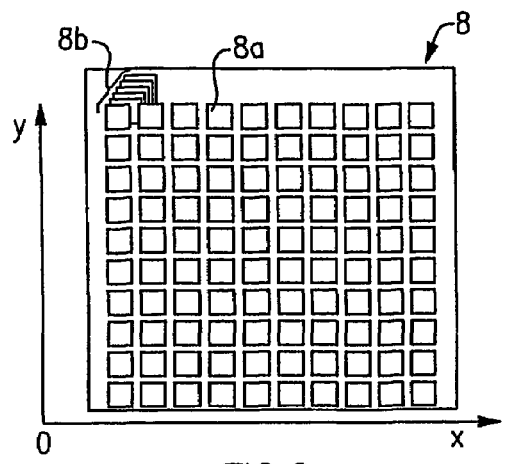
FIG. 2 is a schematic representation of a matrix of points formed in a storage medium.

FIG. 2 shows in greater detail the storage medium 8 arranged in the form of a flat sheet, herein referred to as a matrix. In this example, the matrix is 1 cm². Each of a plurality of points on the matrix is defined by its rectilinear coordinates (x, y). An image-forming system (not shown) reduces the object beam 4 to the sub-hologram 8a having a minimum size at one of the x, y point of the matrix. A point in physical space defined by its rectilinear coordinates contains a plurality of packets 8b.

In this case, a 1 mm² image 8a is obtained by focusing the object beam 4 onto the storage medium 8 centered at its coordinate. Due to this interference between the two beams 1,4, a diffractive image 8a 1 mm² in size is recorded in the storage material 8 centered at the coordinates of the matrix. Spatial multiplexing is carried out by sequentially changing the rectilinear coordinates. The object beam 4 focuses on the storage material 8 so that a separate image 8a is recorded at a unique position in the plane defined by its coordinates (x, y). This spatial multiplexing results in a 10 by 10 matrix of diffractive images 8a. Angle multiplexing is carried out by sequentially changing the angle of the reference beam 1 by means of mirrors (not shown). Angle multiplexing is used to create 15–20 packets of information 8b corresponding to 15 discrete variations of the angle of incidence of the reference beam. However, also achievable is angle multiplexing using 20–25 angles using simple angular multiplexing or 40–50 angles using symmetrical angular multiplexing. A data packet is reconstructed by shinning the reference beam 1 at the same angle and spatial location in which the data packed was recorded. The portion of the reference beam 1 diffracted by the storage material 8 forms the reconstruction, which is typically detected by a detector array. The storage material 8 may be mechanically shifted in order to store data packets at different points by its coordinates (x, y).

Reading Process

Figure 3:
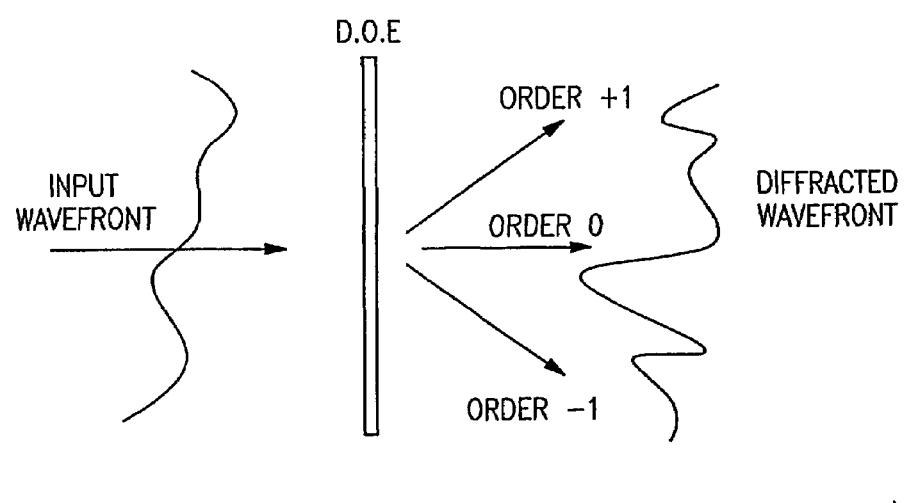
FIG. 3 illustrates the principals of a diffractive optical element.

Diffractive optical elements (DOEs) are wavefront processors which can modify the characteristics of laser beams. A DOE works by breaking up an incoming light wavefront into a large number of waves and then recombining these waves to form a completely new wavefront. FIG. 3 shows the input waveform broken up by the DOE into diffracted beams of order +1 and order −1 symmetric about the zeroth order, where the zeroth order is the transmitted beam without alteration of the direction.

By this process, an input wavefront is shaped by the DOE into a diffractive wavefront. A DOE can reconstruct the desired wave front either in near field (Fresnel element) or in far field (Fourier element). A description of the current state of diffractive optics can be found in the book entitled "Digital Diffractive Optics: An Introduction to Planar Diffractive Optics and Related Technology" by B. Kress and P. Meyruies (Wiley & Sons, 2000).

The transmittance of a DOE is expressed by the formula shown, as follows:

$$T_H = A \cdot e^{i\left(\frac{2\pi}{\lambda} n \cdot e + \phi'\right)}$$

where A is the wave amplitude, Lamda ($\lambda$) is the wavelength, n is the refractive index, e is the depth of carving of the grating (feature depth), and $\phi'$ is the phase modulation of the DOE output wave.

There are two types of DOEs: static and dynamic. The present invention uses dynamic diffractive optical elements (DDOE). In contrast, a static DOE is a DOE in which the diffraction pattern (the structure that is called "feature" of the DOE surface) is not changing with time. An example of a static diffractive optical element is a Fresnel lens etched on a substrate. A DDOE is an optical element in which the diffraction pattern is changing with time. As will be explained below, the micro actuators of the mirror elements 10, 40 of FIGS. 5, 6 are powered and controlled by electricity which modifies the diffraction structure by changing the features spacing and positioning of the mirrors. The mirror elements 10, 40 are used in implementing the dynamic diffractive optical elements of the present invention.

Figure 4A:
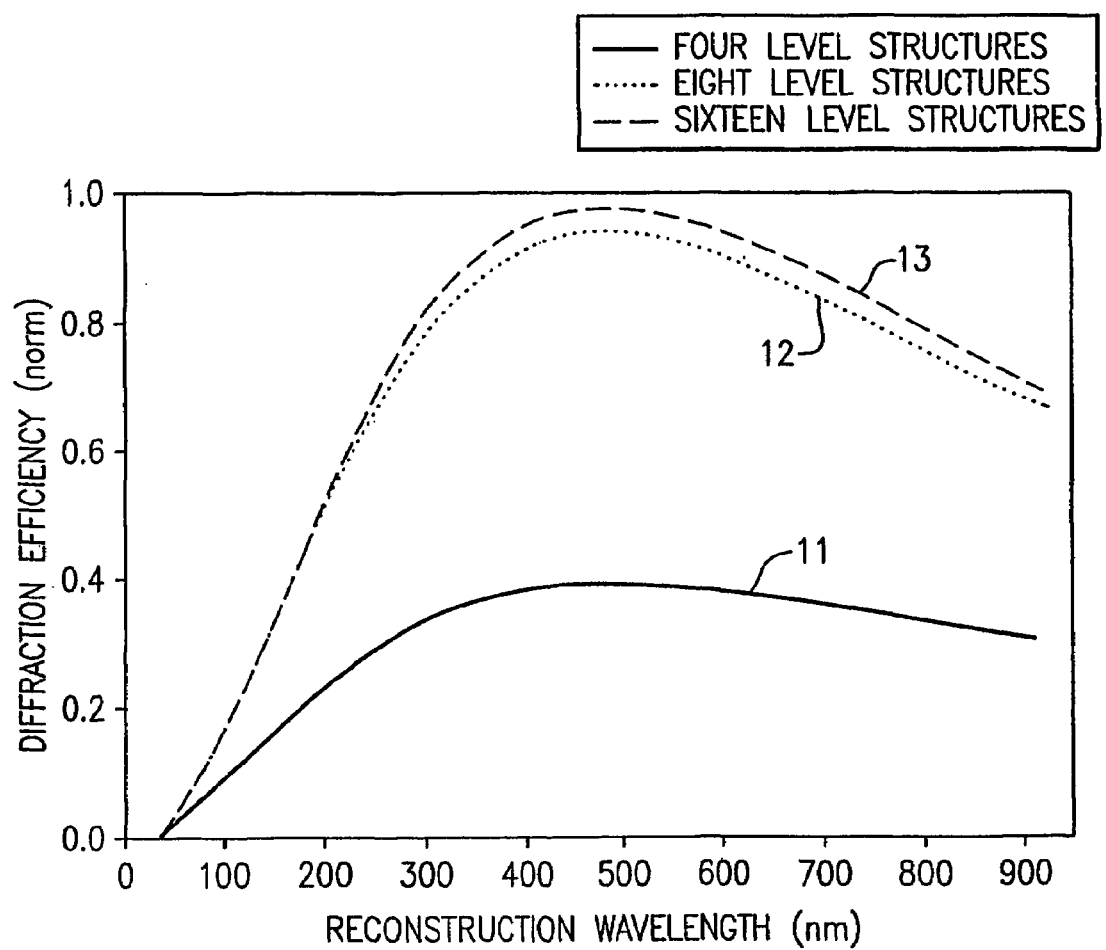
FIGS. 4a, 4b shows diffraction efficiency as a function of reconstruction wavelength for different levels of quantization.
Figure 4B:
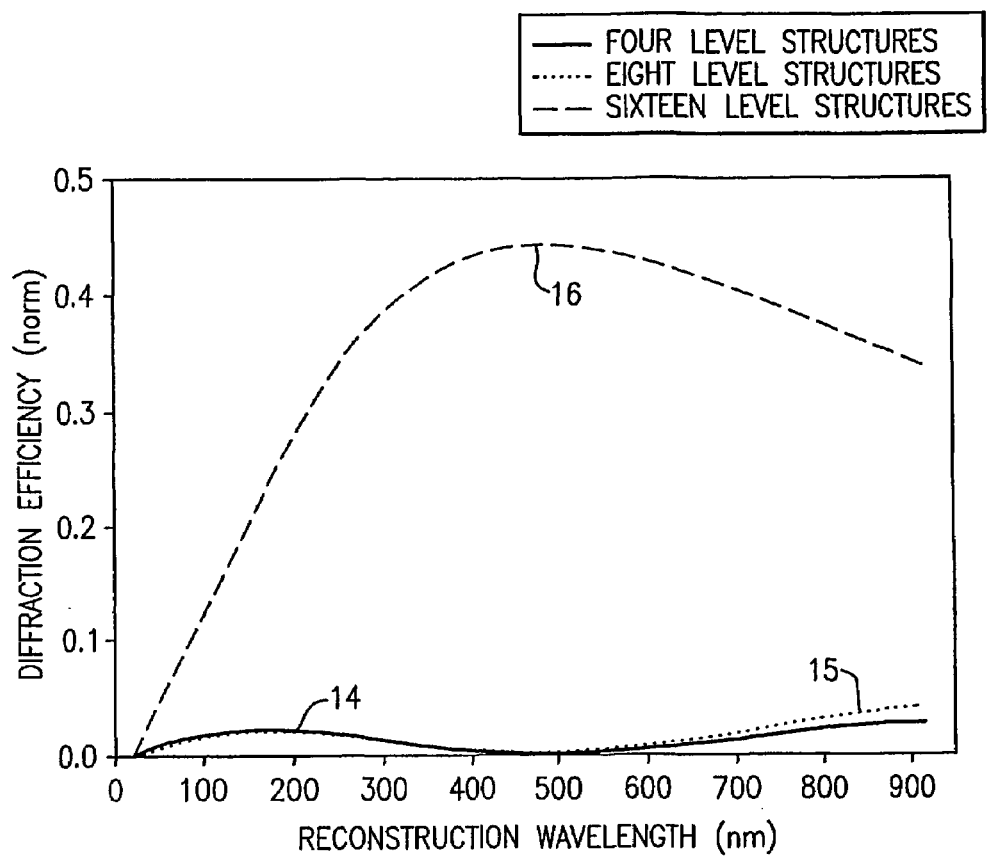
Figure 4C:
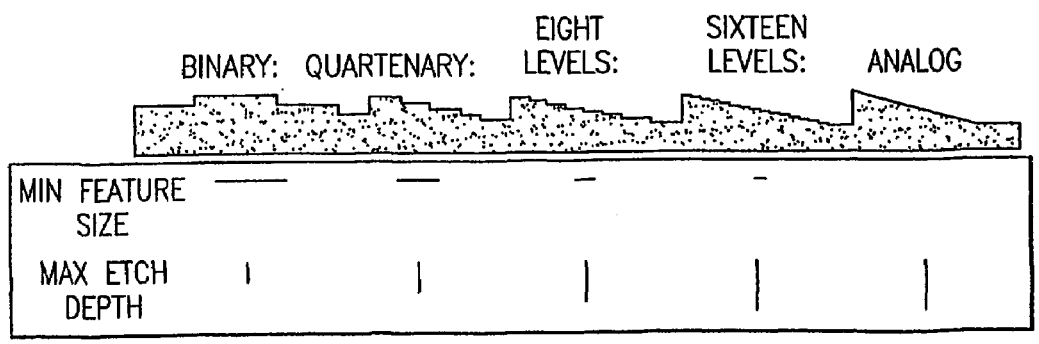
FIG. 4c shows a diffractive optical element at different levels of quantization.

FIGS. 4a, 4b represent the diffraction efficiency for different level of sampling and for different angles. The first order diffraction efficiency (in normalized units) is plotted versus the reconstruction wavelength (nm) for binary, four level, eight level, and the sixteen level structures shown in FIG. 4c. FIG. 4c also shows the minimum feature size and maximum etch depth for each of the structures.

FIG. 4c is a grating profile, that is to say that it is an enlarged view of a cut grating at different levels of quantization. The five levels of sampling shown are binary, quaternary, eight levels, sixteen levels, and analog. The diffraction efficiency related to the number of samples to implement a phase profile, the "ideal one" being the analog profile. The curves 11–16 represents the diffraction efficiency depending on the number of structure samplings 4, 8, or 16. In FIGS. 4a and 4b curves 11–16 are shown in a graph plotting the reconstruction wavelength in nanometers against the diffraction efficiency in normalized units. Curves 11 and 14 represent the diffractive wavefront for the four level structure. Curves 12 and 15 represent the diffractive wavefront for the 8 level structure. Curves 13 and 16 represent the diffractive wavefront for the 16 level structure. FIG. 4a represents the diffraction efficiency for the first order (+1) diffracted wavefront (see FIG. 3). FIG. 4b represents the diffraction efficiency for the first order (−1) diffracted wavefront. For instance for 800 nanometer in FIG. 4a, the diffraction efficiency for the 4 level structure is roughly 0.35, for the 8 level structure it is 0.75, and roughly 0.8 for the 16 levels structure. In FIG. 4b, representing the output at order −1, there is at 800 nanometer the four level structure is approximately 0.02, for the 8 level structure it is 0.04, and for the 16 level structure it is 0.4.

FIGS. 5 and 6 show two micromirror elements, a pyramidal element 10 and a piston element 40. It will be shown how in the present invention these micromirrors can be used to implement dynamic diffractive optical elements for diffractive data storage reading.

FIG. 5a through FIG. 5c illustrate a class of deformable cantilever beam micromirrors (CBM). A description of how to make CBMs is described in the paper by Hubert Lakner et al. entitled "Micromirrors for direct writing systems and scanners", Fraunhofer Institute of Microelectronics Circuits and Systems, Grenzstrasse 28, D-01109 Dresden, Germany. FIG. 5a shows a top view of the pyramidal element 10 comprising mobile parts 12, 13 crossing a silicon substrate 21 having at its corners four posts 14 attached to the substrate 21. FIG. 5a shows a side view of the pyramidal element 10 having the four mirror segments 23 supported by the supporting posts 14 on the silicon substrate 21. The freestanding mirror elements 23 are suspended by the supporting posts 14 over the air gap 29 with an underlying address electrode 22. The address electrode 22 emits an electric field which will move the mirror elements 23. An applied force produce by electric power source 20 applied between the mirror elements 23 and the address electrode 22 causes the mirror elements 23 to deform into the air gap 29 due to the acting electrical forces. The voltage of the electric power source 20 is controlled by a driver that can be connected to a controller, such as a microprocessor or computer. The dotted line 26 in FIG. 5b indicates the position of the mirror elements 23 when they are not activated. The mirror elements can move downward until they contact the stopper 27 which prevents them from contacting the address electrode 22. FIG. 5c shows the principal of phase modulation by the pyramidal element 10. The incoming light 33 interacts with the deformed micromirror elements 23 to produce the phase profile 31 as shown in the formula 34. As the voltage of the power source 20 varies, the mirror elements 23 open and close like a "dynamic flower".

FIGS. 6a through 6c represent a micromirror configured as a piston element 40 realized by microlithography on a substrate 45. A mirror plate 48 hinged to four cantilever beams 41 gives rise to a piston-like motion upon electrical activation of power source 44. The four cantilever beams (i.e., flexible arms) 41 are supported by the four support posts 42. It therefore allows for a pixelwise adjustment of the phase of the incident light. FIG. 6a shows a top view of the piston element 40. The substrate 45 has four support posts 42. The flexible arms 41 move the piston with a spring effect. The power source 44 creates a voltage difference between the mirror 48 and the address electrode 46. This constitutes the actuator with the flexible arm 41, pivoting the mirror 48 on the supporting post 42. The holes 43 are implemented during the manufacturing process to allow handling of the component in the manufacturing process.

The pistons 41 operate just like a set of micro lift platforms going up and down staying parallel to themselves. As shown in FIG. 6c, the incoming wavefront 54 is modulated as determined by the driver voltage 44. The pistons 41 are controlled by voltage applied to the address electrodes 46. This voltage 44 is controlled by a driver that can be connected to a computer. With reference to FIG. 6c, the phase modulation resulting from the dynamic positioning of the piston element 40 is described. The low level of displacement 51a puts the mirror 48 in position 53. The high level of displacement 51b puts the mirror 48 in the position 52.

Figure 7A:
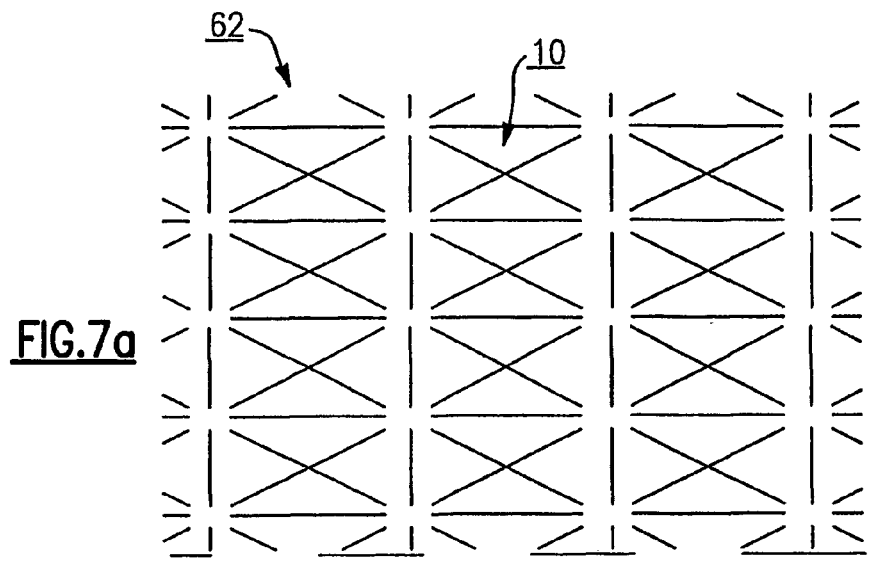
FIG. 7a shows a SEM photograph of an array of pyramidal elements.
Figure 7B:
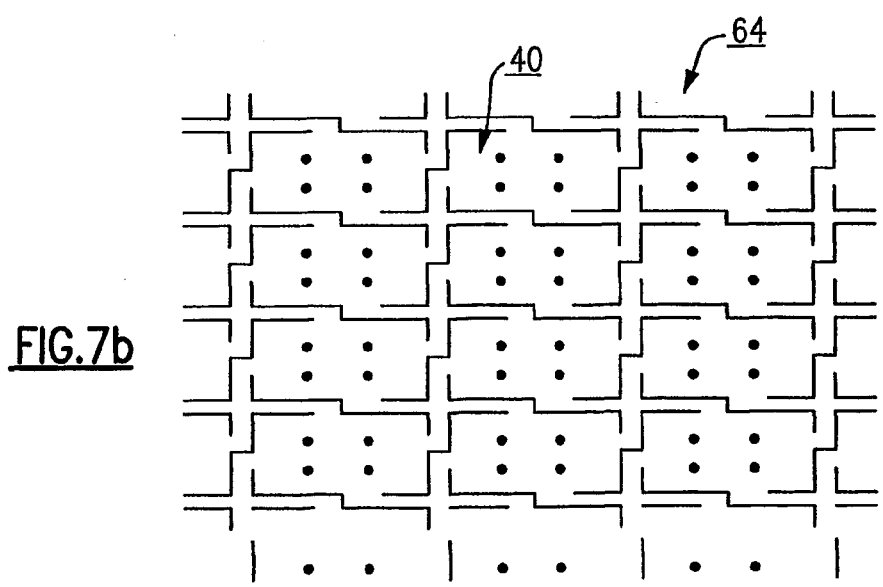
FIG. 7b shows a SEM photograph of an array of piston elements.

FIG. 7a shows an SEM (scanning electronic microscope) photograph of an array 62 of pyramidal elements 10. FIG. 7b shows an SEM photograph of an array 64 of piston elements 40. The motion of the pyramidal elements 10 or piston elements 40 in the arrays of FIG. 7a and FIG. 7b, respectively, is described as follows. The moving up and down of the elements controls the array of pyramidal elements or piston elements represented in FIGS. 7a, 7b, respectively and gives a succession of diffractive pattern that can be programmed in a given range, by a computer. Each, pattern implements an optical function. In other words, the laser light reflected by a piston in a low position will interfere with the light reflected by a piston in a high position that will interfere with the light reflected by their piston neighbors in the up or down position and so on with all the pistons. With appropriate calculation from the theory of diffraction, it is thus possible to shape a wavefront (in a limited range) to fulfill application needs. The process is satisfied only when the size of the elements 10, 40 are sufficiently small compared to the wavelength (in the micron and submicron range).

Figure 8:
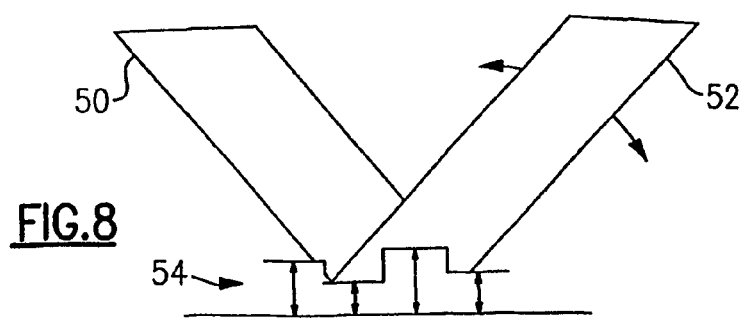
FIG. 8 shows an addressing device using diffractive optical elements.

FIG. 8 illustrates the principal of using dynamic diffractive optics to implement addressing of a read beam. A laser beam 50 is shaped by reflection off of a plurality of micro mirrors 54 producing an addressing beam 52 at a predetermined angle. The micro mirrors 54 may be the pyramidal elements 10 or piston elements 40 previously described.

The process of angular addressing shown in FIG. 8 can be explained as follows. A static grating (DOE) will diffract a laser beam and change the propagation direction of this laser beam depending of the grating characteristics, such as the spacing between the grating lines. The direction of the laser beam in a static grating can be changed by changing the characteristic of the grating. An angular modification will come from a modification of the spacing of the grating features associates with a specified wavelength range.

In contrast to the static grating, in the dynamic DOE 54, the grating profile changes through computer commands altering the micro shape of the DOE 54. This has the same effect as changing one static DOE to another static DOE would have. Thus, the micro mirror elements 54 move by an electric command without actually moving any device Oust the micro solid state actuator will move). This micro movement changes the direction of the laser beam wavefront. A DDOE thus replaces a set of static mirror (every one having a specific angle purpose) or a rotation scanning mirror, by one solid state device, lowering the volume, lowering the cost, and allowing for mass production.

Figure 9:
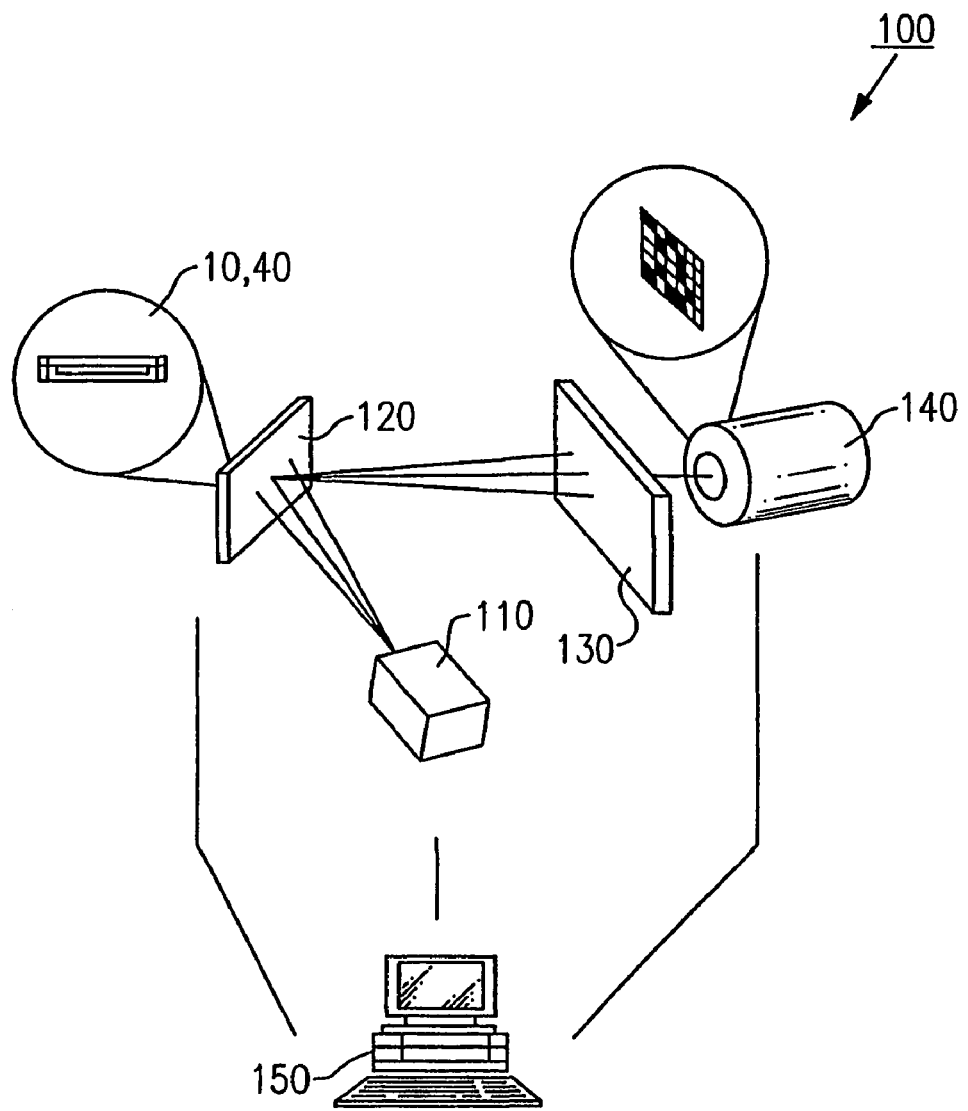
FIG. 9 shows a dynamic reading system using diffractive optical elements according to the present invention.
Figure 10:
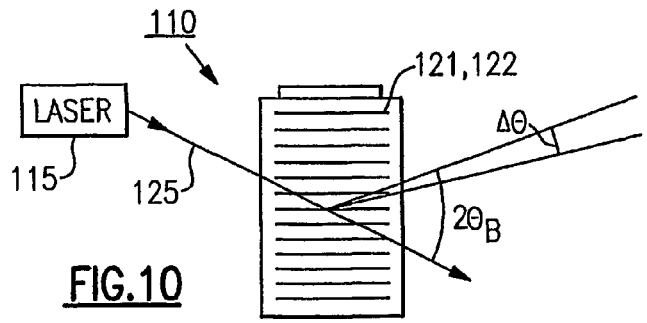
FIG. 10 shows an acousto-optic system according to the present invention.

FIG. 9 shows a solid state reading system 100 comprising a DDOE array 120 comprising diffractive optical elements 10, 40, an acousto-optic system 110, a storage medium 130, and a CCD (charge couple device) 140. The computer 150 is configured to control the DDOE array 120, the acousto-optic and amplification system 110 and the CCD device 140. The DDOE array 120 operates by the diffraction principles illustrated in FIG. 8 using the mirror elements of FIG. 5 and FIG. 6 configured as arrays which is illustrated in FIG. 7. In one embodiment, the storage memory 130 is configured having the storage matrix 8 shown in FIG. 2. In alternate embodiments, the diffractive patterns could be stored in a tape or disc form, as well as the sheet matrix form. The acousto-optic (AO) device 110 directs a laser beam at an angle to the micromirror array 120. FIG. 10 shows an individual acousto-optic device 110 according to the present invention. When acousto-optical crystals are subjected to stress, especially by means of a transducer usually consisting of a piezoelectric crystal, they modify the angle of diffraction of the light and, in general, of the electromagnetic wave which passes through them. In order to modify the value of the diffraction angle of the emerging beam. All that is therefore required is to modify the actuating frequency of the piezoelectric transducer.

Thus, as shown in FIG. 10, the variations in orientation along OX and OY (referring to the rectilinear co-ordinates of FIG. 2) of the incident read beam 125 emanating from the low-power laser 115 are obtained by subjecting this beam to two acoustooptic components 121, 122. Consequently it may be understood that, by varying the vibration frequency of the piezoelectric crystal associated with the acoustooptic component(s), it becomes possible to modify, very rapidly, the desired orientation of the grating within the rows and columns of the data-carrying matrix 130. The limiting factor then becomes the dynamic diffractive optical elements which act on the angle of incidence of the read beam at the matrix 130.

The wavefront from the laser 115 of the acousto-optic system 110 is thus directed at an angle to the DDOE mirror array 120. The DDOE array, as explained above, uses MEMS technology. But, it should be mentioned that MEMS technology has also been used in the prior art for angularly routing a laser beam only with a reflective effect and not with a diffractive effect. In the case of pure reflection, the diffraction effect is actually considered to be noise. It should be noted that the elements 10, 40 are being used herein in the arrays 62, 64 as diffractive elements and not as mirrors for reflection.

FIG. 9 shows the system 100 uses a plurality of DDOE elements 120 operating by phase shifting. The acousto-optic device 110 gives a fast angular XY beam for scanning the storage medium 130. The DDOE is partitioned into cells. Every partition of the DDOE is addressed by the scanning (XY axis) of the beam coming from the AO. The AO is a double device implementing XY scanning. This means that the scanners are orthogonally mounted with one scanning the vertical direction (y) and the other scanning the horizontal direction (x).

Every part of the DDOE array 120 is programmed to address the matrix 130 at a given time on the XY axis. By this method, all of the points on the matrix 130 can be addressed. That is, all the XY coordinated can be reached. The angular multiplexing is taken into account since combination of the AO 110 and the DDOE array 120 can also address with suitable programming every point of the storage medium 130 at a plurality of beam angles.

Figure 11:
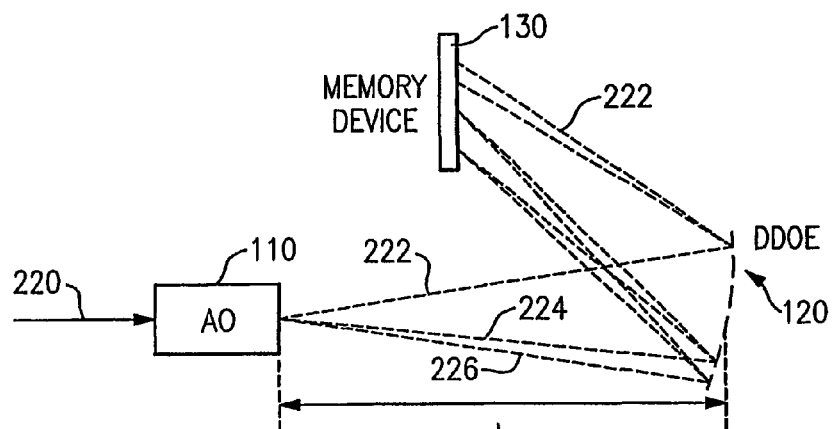
FIG. 11 shows a reader of a diffractive optics memory according to the present invention.

FIG. 11 shows the coherent light beam 220 input to the acousto-optic device (AOD) 110 which is capable of deflecting the light beam 220 through a range of angles. Three possible deflections are shown of the light beam 220 at different angles to create the light beams 222, 224, 226. A rapid response time is achievable with the AOD 110. The maximum angle deflected by the AOD 110 is approximately 4 degrees. However, the angular range typically necessary for addressing the memory 130 is approximately 30 degrees. An array of diffractive optical elements (DDOE) 120 compensates for the limited addressing angle range of the AOD 110. The size of a diffractive optical element of the array 120 has to be at least one square millimeter to process the complete coherent light beam 220.

The number of actual DDOE elements in the DDOE array 120 (each element having 200 dynamic cells of 5×5 microns) will depend on the angular range targeted. For instance, to reach the 30° angular range it is necessary to use 8 DDOEs with a geometrical distance (d) between DDOE array 120 and the AO 110 of 20 centimeters. The number of packets of data that can be recorded will depend of the number of DDOEs. The storage capacity that can be addressed will depend also on the DDOE cell size. It will also depend on the distance between the AO 110 and the DDOE array 120. So a compromise is selected for every application within the above-mentioned range. The angular control is realized by controlling the voltage applied to the AO 110. For a given voltage value a specific angle will induce a specific addressing angle. This specific angle will be the output beam angle of the AO 110. The beam coming from the AO 110 is then routed to the DDOE 120 which will in turn diffract the beam toward the memory 130 to address a selected packet therein. The DDOE 120 has an angular addressing range between 4 and 5 degree.

Figure 12:
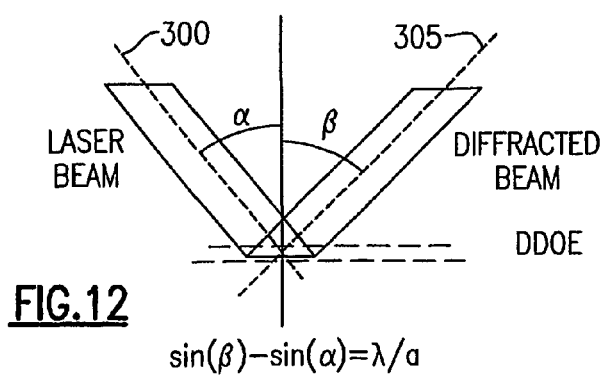
FIG. 12 shows diffraction of a light beam from a diffraction grating according to the present invention.
Figure 13:
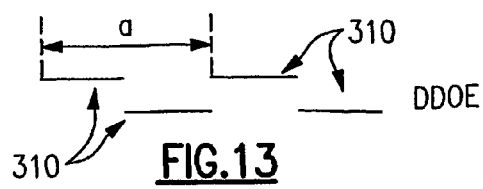
FIG. 13 shows a diffraction grating according to the present invention.

The output beam from DDOE 110 is diffracted. This diffractive process is further explained in reference to FIG. 12. FIG. 12 represents a rectangular profile grating that can be obtained according to the equation:

$$\sin(\beta)-\sin(\alpha)=\lambda/a$$

where "$\lambda$" is the wavelength and "a" is the grating period as shown in FIG. 13.

FIG. 13 represents an enlarged view of the grating of the memory 130. The minimum feature size of a cell 310 is 5 microns. This represents a static grating. Every cell (piston) has a 5×5 micron dimension. To modify the grating step it is necessary to activate selected activators and not activate other ones. By changing the grating step the diffraction angle will change according to the equation associated with FIG. 12. This dynamic step programming allows 5 degrees of angular addressing angle to be achieved. To increase this range the DDOE is used as shown in FIG. 14.

Figures 14, 15:
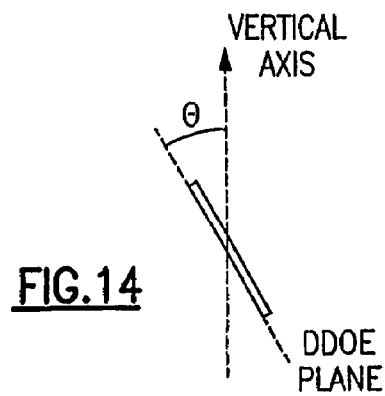
FIG. 14 shows orientation of a diffractive optics element according to the present invention.
FIG. 15 shows the diffracted beam angle for different orientations of a diffractive optics element according to the present invention.

FIG. 14 illustrates the operation of achieving the targeted angular range for the DDOE. It is shown that the DDOE plane for every DDOE has to be located in reference to the vertical axis. The possible values of this angle θ are displayed in the table of FIG. 15. These values were calculated with the equation introduces in FIG. 12.

Referring to FIG. 15, the first column gives the reference number of the diffractive optical element (DDOE). The second column gives the value of θ for every DDOE. The third column give the minimal diffracted angle. The fourth column represents the maximum diffracted angle. For every DDOE the diffracted beam angle is between a minimum and maximum depending on the dynamic grating step value. From this table, it can be seen that the extreme values are 2 degrees and 44 degrees. Thus, by selecting one of these angles of the table of FIG. 15, the range of 30 degrees required for the present invention is satisfied.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

The invention claimed is:

1. An apparatus for reading information from a diffractive optics memory having stored therein information located at a plurality of points of said memory and at a plurality of angles at each one of said points so as to form a plurality of packets of information at each one of said points, comprising:
   a laser generating said coherent light beam;
   a plurality of dynamic diffractive optical elements configured to shape and angular direct a wavefront of a coherent light beam to said memory at one of said angles of one of said points to reconstruct one of said packets of information; and
   an acousto-optic device for deflecting toward said dynamic diffractive optical elements said wavefront at a deflection angle with respect to a plane formed by said diffractive optical elements wherein the dynamic diffractive optical elements are arranged with different angles with respect to the diffractive optics memory and the acousto-optic device so that the dynamic diffractive optical elements provide respective minimum and maximum diffractive angles and said wavefront is shaped by phase shifting of said diffractive optical elements.

2. The apparatus of claim 1, further comprising: a detector array comprising a plurality of cells receiving a portion of said wavefront deflected by said diffractive optical elements and deflected by said memory.

3. The apparatus of claim 2, wherein said detector array is a CCD detector array.

4. The apparatus of claim 1, wherein said laser is a low powered laser configured to produce said coherent light beam.

5. An apparatus for reading information from a diffractive optics memory having stored therein information located at a plurality of points of said memory and at a plurality of angles at each one of said points so as to form a plurality of packets of information at each one of said points, comprising:

a laser generating said coherent light beam;

a plurality of dynamic diffractive optical elements configured to shape and angular direct a wavefront of a coherent light beam to said memory at one of said angles of one of said points to reconstruct one of said packets of information; and an acousto-optic device for deflecting toward said dynamic diffractive optical elements said wavefront at a deflection angle with respect to a plane formed by said diffractive optical elements wherein the dynamic diffractive optical elements are arranged with different angles with respect to the diffractive optics memory and the acousto-optic device so that the dynamic diffractive optical elements provide respective minimum and maximum diffractive angles, wherein each of said diffractive optical elements comprises a pyramidal element.

6. An apparatus for reading information from a diffractive optics memory having stored therein information located at a plurality of points of said memory and at a plurality of angles at each one of said points so as to form a plurality of packets of information at each one of said points, comprising:

a laser generating said coherent light beam;

a plurality of dynamic diffractive optical elements configured to shape and angular direct a wavefront of a coherent light beam to said memory at one of said angles of one of said points to reconstruct one of said packets of information; and an acousto-optic device for deflecting toward said dynamic diffractive optical elements said wavefront at a deflection angle with respect to a plane formed by said diffractive optical elements wherein the dynamic diffractive optical elements are arranged with different angles with respect to the diffractive optics memory and the acousto-optic device so that the dynamic diffractive optical elements provide respective minimum and maximum diffractive angles, wherein each of said diffractive optical elements comprises a piston element.

7. An apparatus for reading information from a diffractive optics memory having stored therein information located at a plurality of points of said memory and at a plurality of angles at each one of said points so as to form a plurality of packets of information at each one of said points:

a laser generating said coherent light beam;

a plurality of dynamic diffractive optical elements configured to shape and anglar direct a wavefront of a coherent light beam to said memory at one of said angles of one of said points to reconstruct one of said packets of information;

an acousto-optic device for deflecting toward said dynamic diffractive optical elements said wavefront at a deflection angle with respect to a plane formed by said diffractive optical elements wherein the dynamic diffractive optical elements are arranged with different angles with respect to the diffractive optics memory and the acousto-optic device so that the dynamic diffractive optical elements provide respective minimum and maximum diffractive angles, and a computer configured to program said diffractive optical elements and said acousto-optic device so as to address said memory at one of said points and one of said angles to reconstruct one of said packets.

8. An apparatus for reading information from a diffractive optics memory having stored therein information located at a plurality of points of said memory and at a plurality of angles at each one of said points so as to form a plurality of packets of information at each one of said points, comprising:

a laser generating said coherent light beam;

a plurality of dynamic diffractive optical elements configured to shape and anglar direct a wavefront of a coherent light beam to said memory at one of said angles of one of said points to reconstruct one of said packets of information; and an acousto-optic device for deflecting toward said dynamic diffractive optical elements said wavefront at a deflection angle with respect to a plane formed by said diffractive optical elements, wherein the dynamic diffractive optical elements are arranged with different angles with respect to the diffractive optics memory and the acousto-optic device so that the dynamic diffractive optical elements provide respective minimum and maximum diffractive angles and each of said plurality of points stores one or more of said packets of information.

9. A method for reading information from a diffractive optics memory having stored therein information in a plurality of packets, each one of said packets defined by one of a plurality of points and one of a plurality of angles of said memory, comprising the steps of:

generating a coherent light beam;

diffractive the wavefront of said coherent light beam with a plurality of dynamic diffractive optical elements so that said wavefront addresses said memory at one of said points and at one of said angles to reconstruct said one of said packets; and directing said light beam towards said dynamic diffractive optical elements at a deflection angle using an acousto-optic device, said dynamic diffractive optical elements being arranged with different angles with respect to the diffractive optics memory and the acousto-optic device so that the dynamic diffractive optical elements provide respective minimum and maximum diffractive angles, wherein said wavefront is shaped by phase shifting of said dynamic diffractive optical elements.

10. The method for reading information of claim 9, further comprising the step of:

directing said light beam towards said dynamic diffractive optical elements at a deflection angle using an acousto-optic device.

11. The method of claim 9, further comprising the step of:
programming said diffractive optical elements so as to address said memory at one of said points and one of said angles to reconstruct one of said packets.

12. The method of claim 9, further comprising the step of:
detecting with a detector array comprising a plurality of cells a portion of said light beam diffracted by said memory.

13. The method of claim 9, further comprising the step of:
generating said coherent light beam from a laser.

14. The method of claim 12, wherein said detector array is a CCD detector array.

15. A method for reading information from a diffractive optics memory having stored therein information in a plurality of packets, each one of said packets defined by one of a plurality of points and one of a plurality of angles of said memory, comprising the steps of:
generating a coherent light beam;
diffractive the wavefront of said coherent light beam with a plurality of dynamic diffractive optical elements so that said wavefront addresses said memory at one of said points and at one of said angles to reconstruct said one of said packets; and
directing said light beam towards said dynamic diffractive optical elements at a deflection angle using an acousto-optic device, said dynamic diffractive optical elements being arranged with different angles with respect to the diffractive optics memory and the acousto-optic device so that the dynamic diffractive optical elements provide respective minimum and maximum diffractive angles, wherein each one of said dynamic diffractive optical elements comprises a pyramidal element.

16. A method for reading information from a diffractive optics memory having stored therein information in a plurality of packets, each one of said packets defined by one of a plurality of points and one of a plurality of angles of said memory, comprising the steps of:
generating a coherent light beam;
diffractive the wavefront of said coherent light beam with a plurality of dynamic diffractive optical elements so that said wavefront addresses said memory at one of said points and at one of said angles to reconstruct said one of said packets; and
directing said light beam towards said dynamic diffractive optical elements at a deflection angle using an acousto-optic device, said dynamic diffractive optical elements being arranged with different angles with respect to the diffractive optics memory and the acousto-optic device so that the dynamic diffractive optical elements provide respective minimum and maximum diffractive angles, wherein each one of said dynamic diffractive optical elements comprises a piston element.

17. A method for reading information from a diffractive optics memory having stored therein information in a plurality of packets, each one of said packets defined by one of a plurality of points and one of a plurality of angles of said memory, comprising the steps of:
generating a coherent light beam;
diffractive the wavefront of said coherent light beam with a plurality of dynamic diffractive optical elements so that said wavefront addresses said memory at one of said points and at one of said angles to reconstruct said one of said packets; and
directing said light beam towards said dynamic diffractive optical elements at a deflection angle using an acousto-optic device, said dynamic diffractive optical elements being arranged with different angles with respect to the diffractive optics memory and the acousto-optic device so that the dynamic diffractive optical elements provide respective minimum and maximum diffractive angles, wherein each of said plurality of points stores a plurality of packets and each packet comprises a sub-holographic image.

* * * * *